(12) United States Patent
Russell

(10) Patent No.: US 7,832,692 B1
(45) Date of Patent: Nov. 16, 2010

(54) PIPE INSTALLATION SUPPORT DEVICE

(76) Inventor: William Russell, 9275 Old Port Gibson Rd., Edwards, MS (US) 39066

( * ) Notice: Subject to any disclaimer, the term of this patent is extended or adjusted under 35 U.S.C. 154(b) by 20 days.

(21) Appl. No.: 12/485,525

(22) Filed: Jun. 16, 2009

(51) Int. Cl.
*F16L 3/16* (2006.01)
(52) U.S. Cl. ............... 248/55; 248/49; 269/289 MR
(58) Field of Classification Search .............. 248/55, 248/130, 132, 49; 269/289 MR, 131, 904
See application file for complete search history.

(56) References Cited

U.S. PATENT DOCUMENTS

| | | | | |
|---|---|---|---|---|
| 375,740 A * | 1/1888 | Gallup | ............ | 248/130 |
| 1,097,273 A * | 5/1914 | Tyler | ............ | 248/55 |
| 1,193,480 A * | 8/1916 | O'Day | ............ | 248/55 |
| 1,891,995 A * | 12/1932 | Marcy | ............ | 248/55 |
| 1,970,840 A * | 8/1934 | Cardwell et al. | ............ | 248/55 |
| 2,893,669 A * | 7/1959 | Kindorf | ............ | 248/55 |
| 3,554,475 A * | 1/1971 | Benno | ............ | 248/55 |
| 3,602,492 A * | 8/1971 | Petrie | ............ | 269/289 R |
| 3,735,973 A * | 5/1973 | Petrie | ............ | 248/55 |
| 4,502,653 A * | 3/1985 | Curtis, Jr. | ............ | 248/55 |
| 5,768,830 A * | 6/1998 | Kelly | ............ | 269/904 |
| 5,934,626 A * | 8/1999 | Collins, Jr. | ............ | 248/132 |
| 6,988,719 B2 * | 1/2006 | Ursell et al. | ............ | 269/289 MR |

* cited by examiner

*Primary Examiner*—Anita M King
(74) *Attorney, Agent, or Firm*—David E. Mixon; Bradley Arant Boult Cummings LLP

(57) ABSTRACT

An apparatus for supporting a pipe segment during installation has been developed. The support includes a frame with two parallel arms and two beams that connect the arms, where each beam extends downward from the arms. Also included are four support bearings located at each corner of the frame, where the bearings provide four separate points of contact for a pipe segment.

3 Claims, 4 Drawing Sheets

PIPE INSTALLATION SUPPORT DEVICE

FIELD OF THE INVENTION

The invention relates generally to a mechanical support device for pipes. More specifically, the invention relates to a support used on pipe sections during installation.

BACKGROUND ART

Pipe installation is commonly done in sections that fit together with threading or other similar techniques. This is especially true for electrical conduit which holds and protects electrical wiring. The sections of conduit are usually made of metal and are typically ten feet in length. Conduit is also commonly suspended in overhead racks called a "trapeze" that is attached to the ceiling.

As mentioned, conduit sections are connected together with common male and female threads. When being installed, one section must be held in place while the threads are aligned with the other section. Aligning the sections can be difficult due to the weight, length and overhead location of the conduit. Therefore a support for installation of pipe sections is desirable.

SUMMARY OF THE INVENTION

In some aspects, the invention relates to an apparatus for supporting a pipe segment during installation, comprising: a frame comprising two parallel arms and two beams that connect the arms, where each beam extends downward from the arms; and four support bearings located at each corner of the frame, where the bearings provide four separate points of contact for a pipe segment.

In other aspects, the invention relates to an apparatus for supporting a pipe segment during installation, comprising: a frame comprising two parallel arms and two beams that connect the arms, where each beam extends downward from the arms; and means for supporting a pipe segment on the frame with more than two points of contact.

Other aspects and advantages of the invention will be apparent from the following description and the appended claims.

BRIEF DESCRIPTION OF DRAWINGS

It should be noted that identical features in different drawings are shown with the same reference numeral.

DETAILED DESCRIPTION

Figure 1:
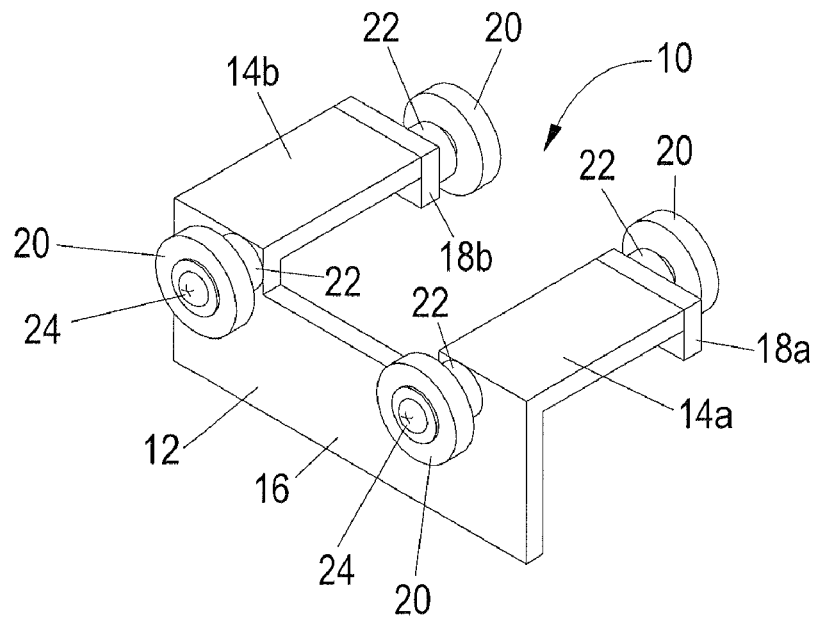
FIG. 1 shows a perspective view of one embodiment of the present invention.

A pipe installation support device has been developed. As shown in the embodiment in FIG. 1, the support device 10 includes a frame 12 with two parallel arms 14a and 14b. In the embodiment shown, the arms 14a and 14b are connected by a front beam 16. Two rear beams 18a and 18b are mounted on the rear of the arms 14a and 14b. Four support bearings 20 are mounted at the front and rear of each arm 14a and 14b. The bearings 20 each include a spindle 22 that allows for rotation of the bearing 20 and a screw 24 that secures the bearing 20 to the frame 12.

Figure 2:
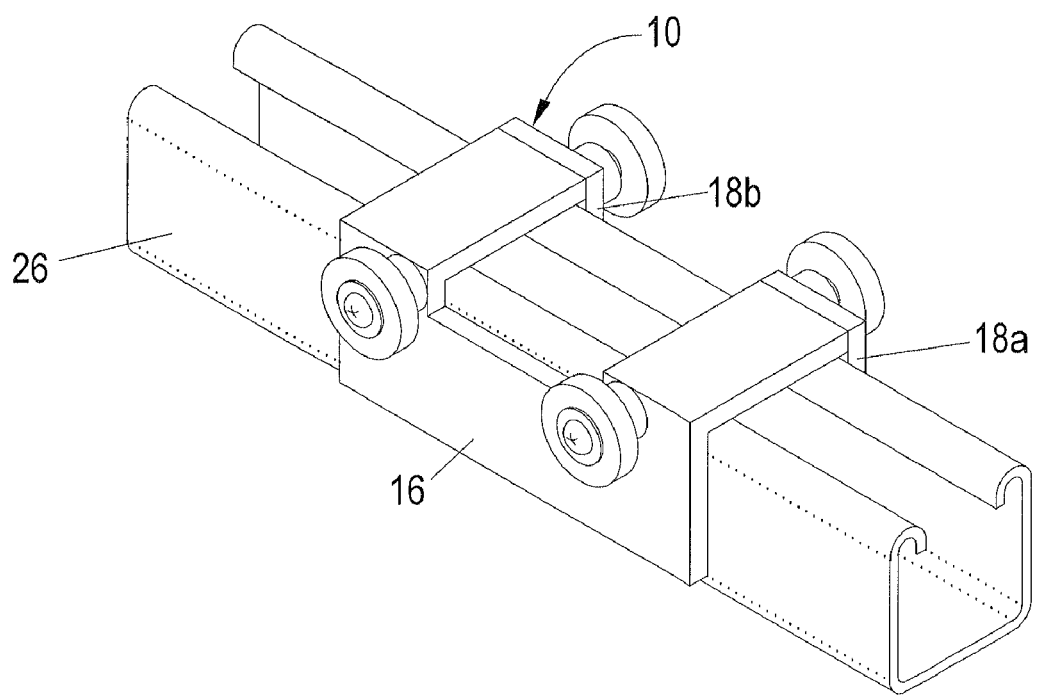
FIG. 2 shows one embodiment of the present invention mounted on a trapeze bracket.
Figure 6:
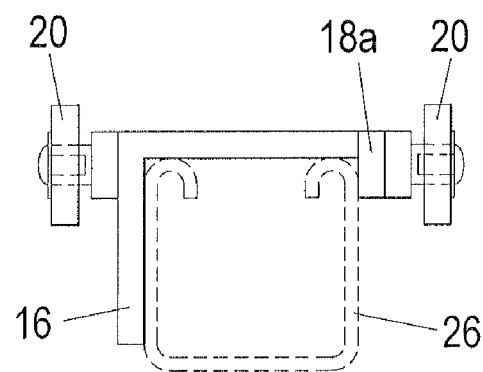

As shown in FIGS. 2 and 6, the support device 10 is designed so that it is dropped across the top of a trapeze frame 26. The device 10 is held in place on the trapeze frame 26 by the front beam 16 and the rear beams 18a and 18b. In this embodiment the arms 14a and 14b are connected by the front beam 16 while the rear beams 18a and 18b are separate. However, in alternative embodiments the rear beams could be connected and/or the front beam could be separated.

Figure 3:
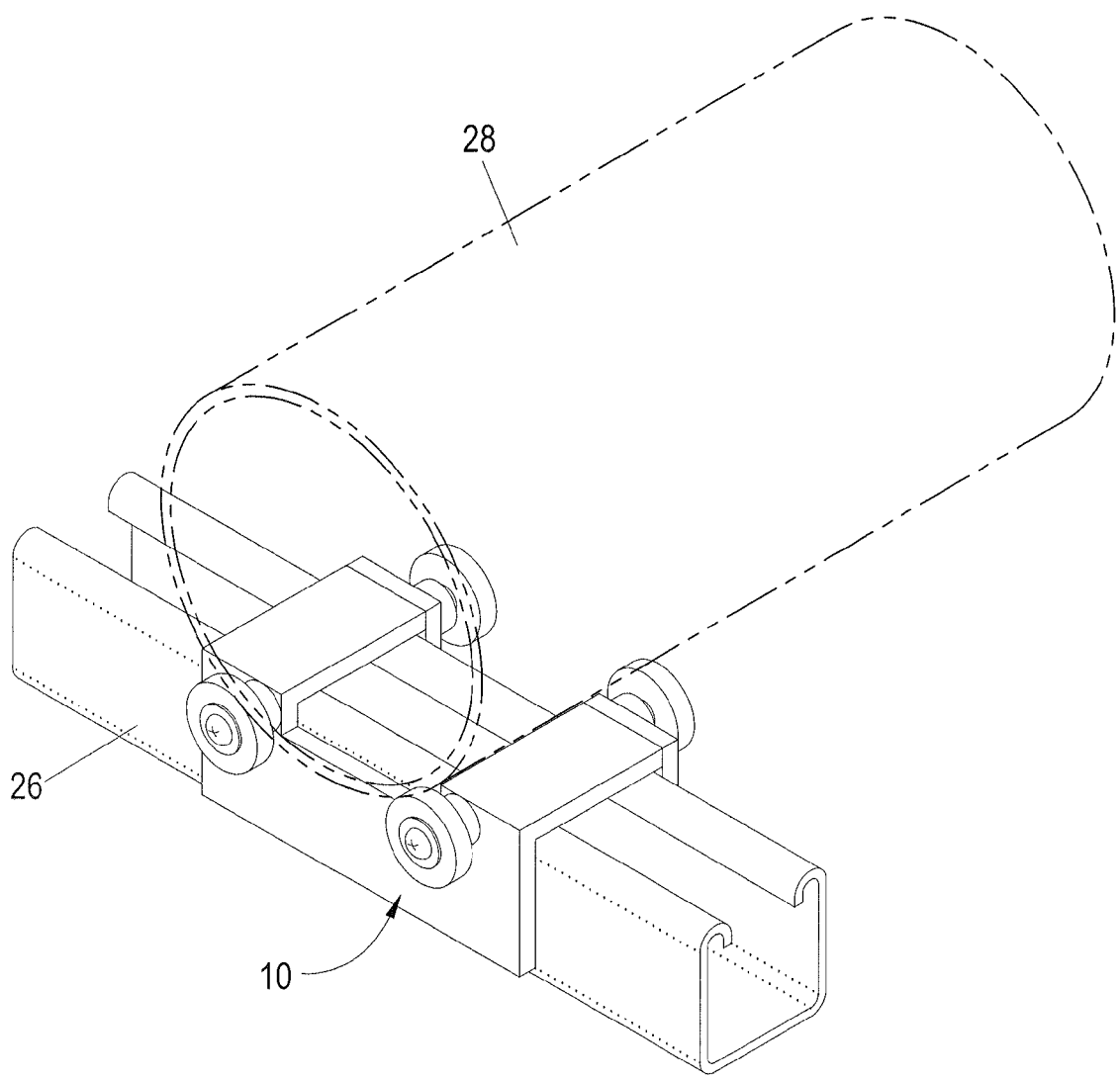
FIG. 3 shows one embodiment of the present invention mounted on a trapeze bracket while supporting a section of conduit pipe.
Figure 4:
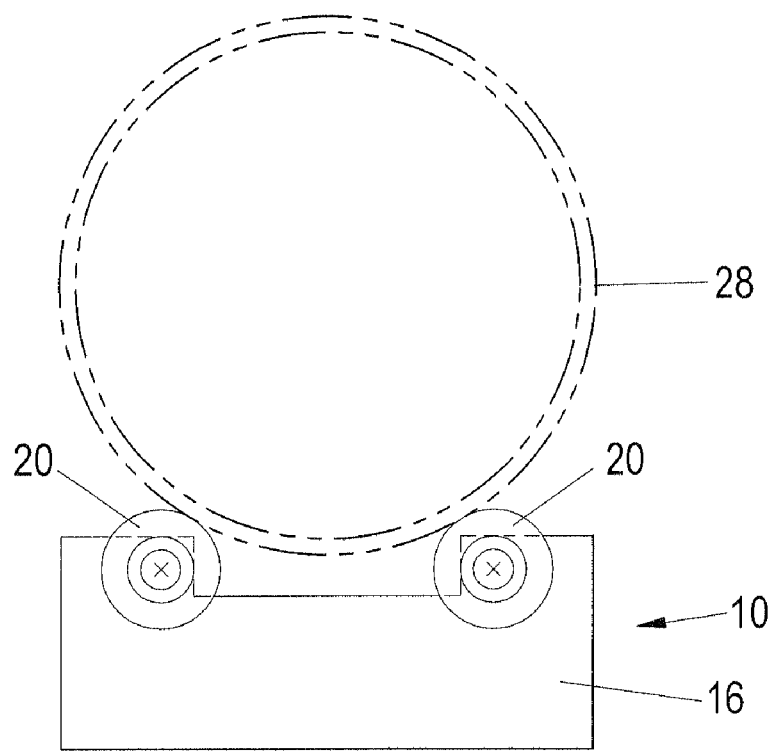
FIGS. 4-6 show front, rear, and side views of one embodiment of the present invention respectively.
Figure 5:
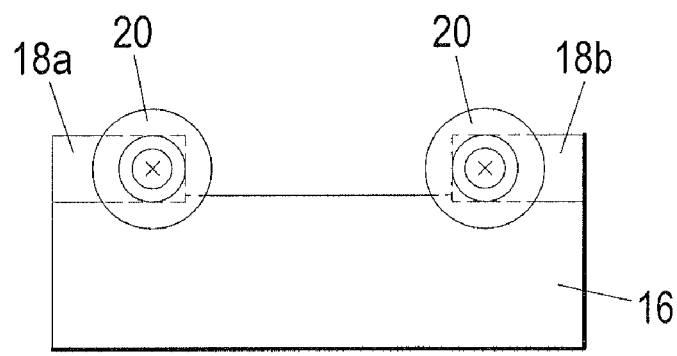

As shown in FIG. 3, a section of pipe 28 is laid across the bearings 20. This allows the pipe 28 to be manipulated into position for installation while providing support and stability for pipe section 28. Once the pipe 28 is in position, it rotates on the bearings 20 while being screwed into position with its mating pipe segment (not shown). One key advantage of the invention is that the pipe 28 has two separate planes of contact with the support 10. The front plane is across the front set of bearings 20 and the rear plane is across the rear set of bearings 20. The two planes provide the needed stability for the pipe while it is being installed.

Figure 7:
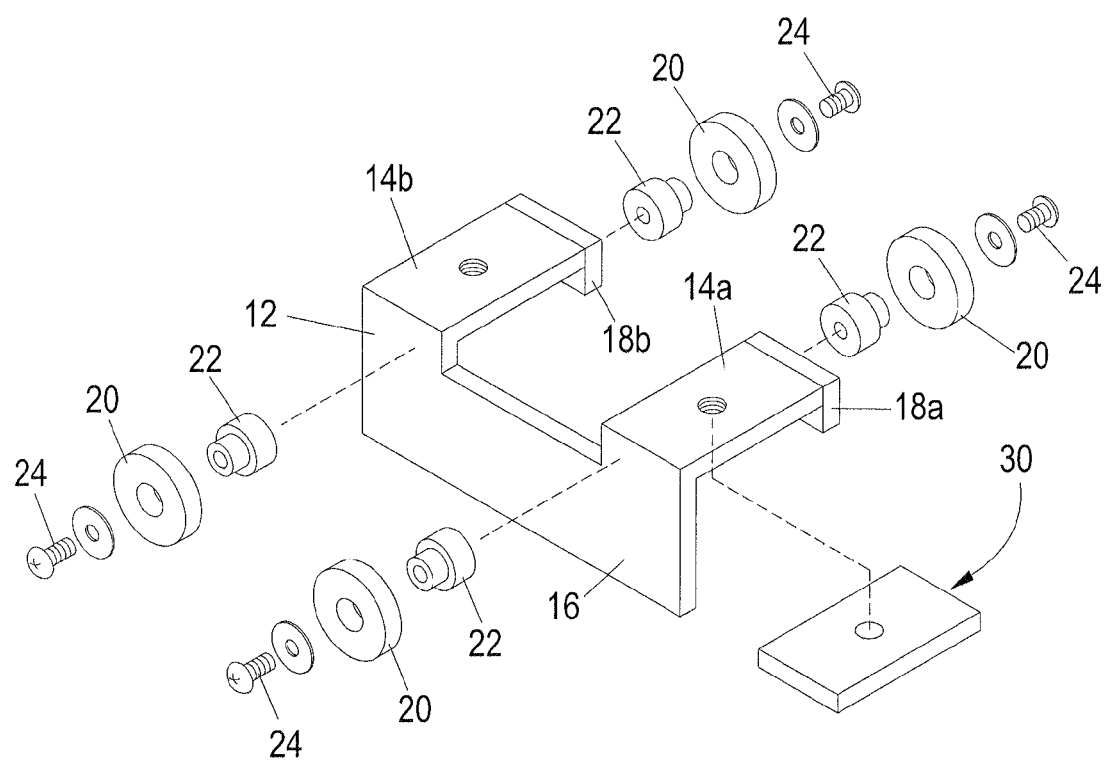
FIG. 7 shows one embodiment of the present invention with additional supports added under the arms of the frame of the present invention.

FIG. 7 shows another embodiment of the present invention. In this embodiment, support blocks 30 are inserted below the arms 14a and 14b. This will elevate the frame 12 when it sits on the trapeze frame 26 to allow the device to be used with smaller sizes (e.g., 2" and 2.5" conduit) of pipe. The support blocks 30 may be removed to adapt to larger sized pipe (e.g., 3"-6" conduit).

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. An apparatus for supporting a pipe segment during installation, comprising:
    a frame comprising two parallel arms, a front beam that connects the parallel arms, and two separate rear beams connected to the rear of each respective parallel arm, where each beam extends downward from the arms;
    a support block placed under each of the two parallel arms between the beams, where each support block adjusts the apparatus in order to support a different size pipe segment; and
    four support bearings located at each corner of the frame, where the bearings provide four separate points of contact for a pipe segment.

2. An apparatus for supporting a pipe segment during installation, comprising:
    a frame comprising two parallel arms, a front beam that connects the parallel arms, and two separate rear beams connected to the rear of each respective parallel arm, where each beam extends downward from the arms;
    a support block placed under each of the two parallel arms between the beams, where each support block adjusts the apparatus in order to support a different size pipe segment; and four support bearings located at each corner of the frame, where the bearings provide four separate points of contact for a pipe segment, where the support bearings are connected to the frame with spindles so that the bearings may rotate with the supported pipe.

3. An apparatus for supporting a pipe segment during installation, comprising:

a frame comprising two parallel arms, a front beam that connects the parallel arms, and two separate rear beams connected to the rear of each respective parallel arm, where each beam extends downward from the arms;

means for supporting a pipe segment on the frame with more than two points of contact; and means for adjusting the apparatus in order to support a different size pipe segment.

\* \* \* \* \*